April 26, 1938. D. DOMENICO 2,115,486
WIND MOTOR
Filed June 18, 1937 6 Sheets—Sheet 4

INVENTOR.
DEIANA DOMENICO
BY Victor J. Evans & Co
ATTORNEYS

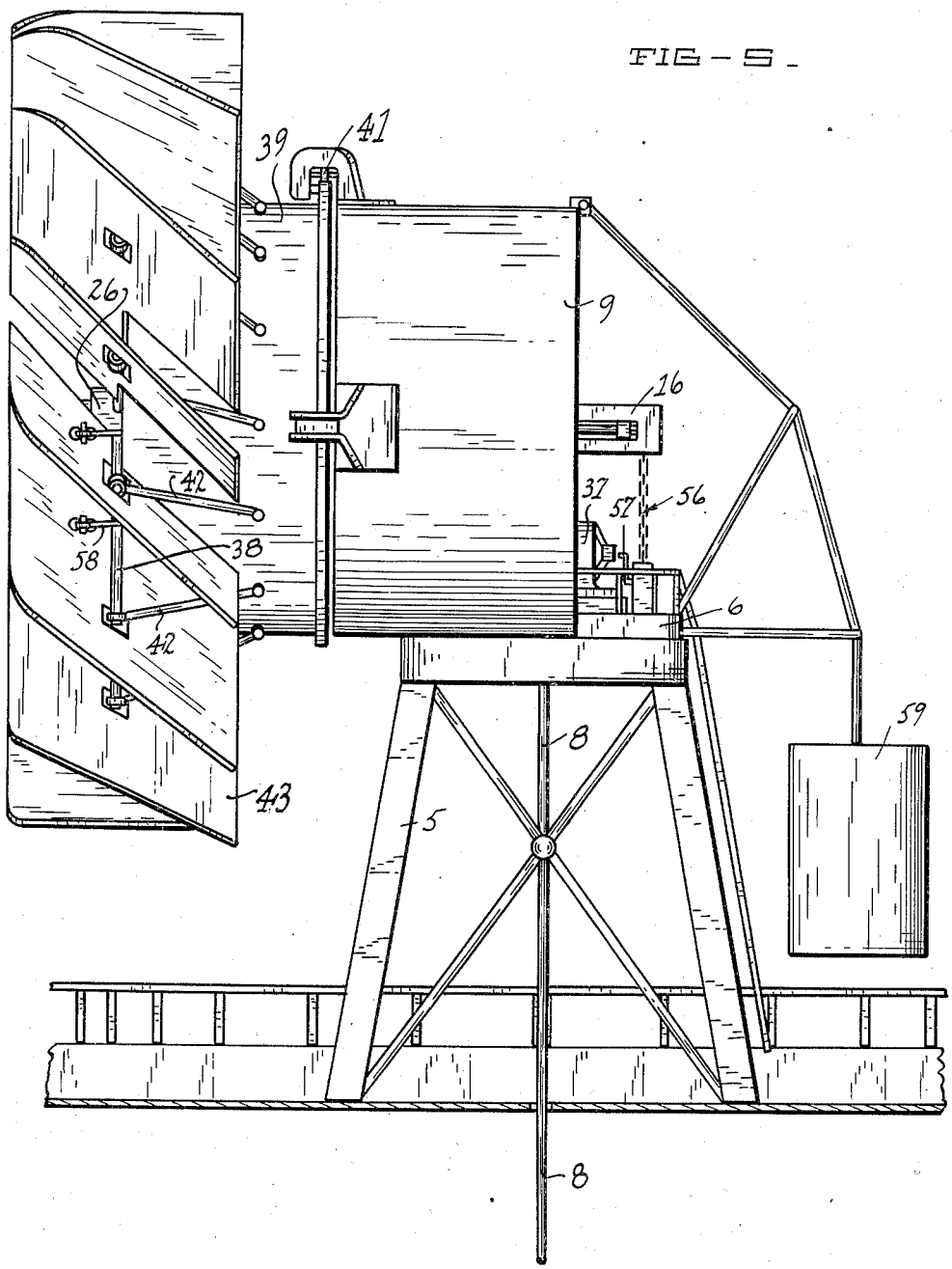

April 26, 1938.  D. DOMENICO  2,115,486
WIND MOTOR
Filed June 18, 1937   6 Sheets-Sheet 6
FIG-9-
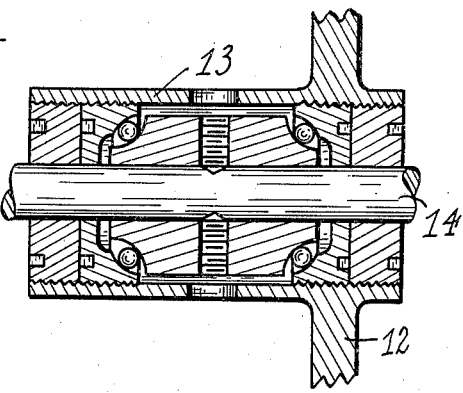
FIG-8-
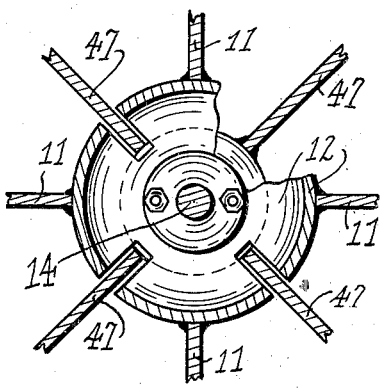
FIG-7-
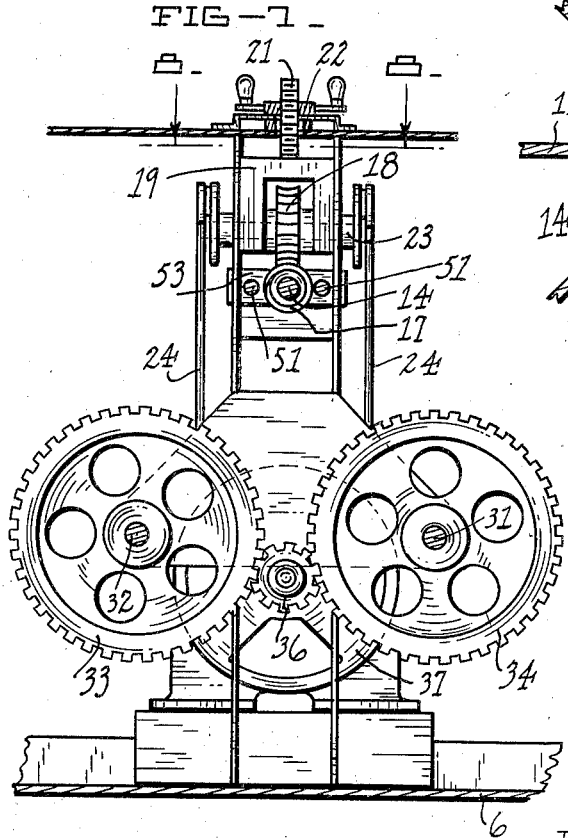
FIG-8-
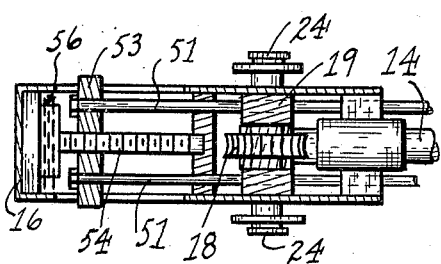
INVENTOR.
DEIANA DOMENICO
BY *Victor J. Evans & Co*
ATTORNEYS.

Patented Apr. 26, 1938

2,115,486

UNITED STATES PATENT OFFICE 2,115,486

WIND MOTOR

Deiana Domenico, San Francisco, Calif.

Application June 18, 1937, Serial No. 149,006

2 Claims. (Cl. 170—62)

This invention relates to improvements in power apparatus and has particular reference to means for deriving power from the wind.

A further object is to provide means for regulating the amount of power by changing the angle of the vanes against which the wind contacts.

A further object is to provide means whereby the angle of the vanes may be changed while the device is in motion.

A further object is to provide means for counterbalancing the apparatus, whereby the same will effectively move about its central pivot.

Other objects and advantages will be apparent during the course of the following description.

In the accompanying drawings forming a part of this specification and in which like numerals are employed to designate like parts throughout the same, Fig. 1 is a front elevation of my device, showing the blades in closed position;

Fig. 5 is a side elevation of Fig. 1, showing the blades partly opened;

Fig. 6 is a cross sectional view taken on the line 6—6 of Fig. 4;

Fig. 7 is an enlarged cross sectional view taken on the line 7—7 of Fig. 4;

Fig. 8 is a cross sectional view taken on the line 8—8 of Fig. 7; and

Fig. 9 is an enlarged cross sectional view of the main bearing.

Figure 1:
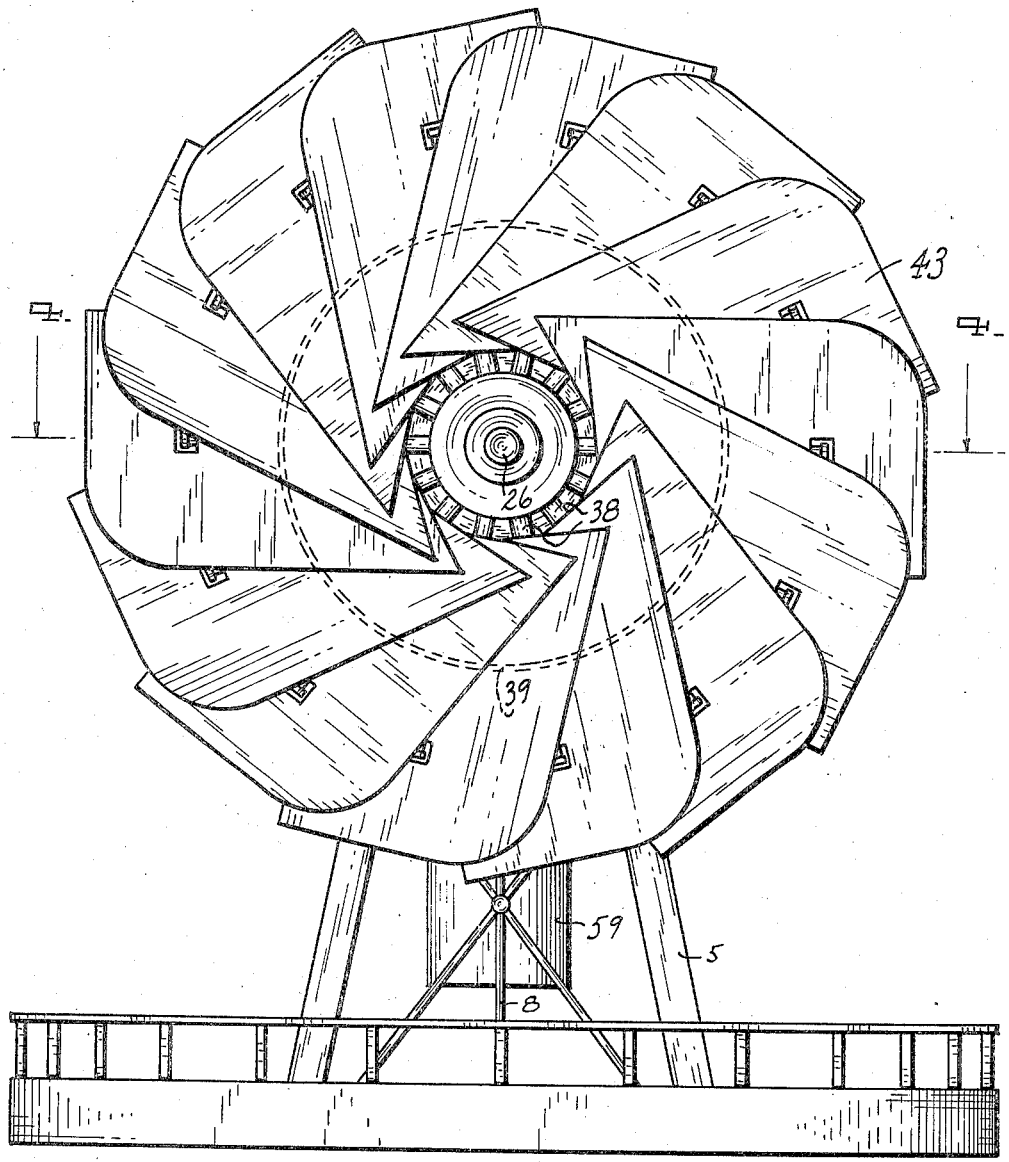

It is a well-known fact that wind is capable of delivering a great deal of power, providing some apparatus is available for collecting and dispensing this power. Various types of windmills have been used, and applicant's invention applies to this class of power apparatus.

In the accompanying drawings wherein for the purpose of illustration is shown a preferred example of my invention, the numeral 5 designates a platform which may be of any desired construction and elevated to any desired height. This platform serves to rotatably support a turntable 6 through the medium of roller bearings 7. Therefore, the turntable may rotate about a central pivot upon the platform 5, which permits the sucker rod 8 to pass downwardly therethrough and around which the parts may turn. Mounted upon the turntable 6 is a casing 9 which is provided with a series of braces 11 which serves to support the cone 12 within which is mounted a bearing 13. This bearing serves to mount, through the medium of roller bearings, a shaft 14 which also has its rear end mounted in a bearing 16, carried upon the brace 11. This shaft 14 carries a worm 17, which may be meshed with a worm gear 18, carried in a sliding bearing 19. This bearing 19 may be moved up and down through the medium of a threaded shaft 21 and a hand wheel 22. The gear 18 is mounted upon a shaft 23, to the end of which crank arms are attached, which crank arms in turn have secured thereto pull rods 24, which connect to the sucker rod 8. Mounted on the forward end of the shaft 14 is a hub 26 having a gear 27 formed integral therewith and meshing with gears 28 and 29 mounted upon the ends of shafts 31 and 32 respectively. Gears 33 and 34, mounted on shafts 31 and 32, respectively engage a gear 36 which may be directly connected to a generator, designated as a whole by the numeral 37.

In order to rotate the shaft 14, the hub 26 has extending radially therefrom rods 38 which are pivoted therein and also to a second casing 39 rotatably mounted on the casing 9 through the medium of rollers 41. Braces 42 connect the ends of the rods 38 with the ring 39. A blade 43 is secured to each of the rods 38; and as these rods are pivotally mounted, the blades can, therefore, be pivoted about the axis of the rod. Slidably secured on the inner surface of the ring 39 is a sliding ring 44 slidable and rotatable with said second casing 46, slidable and non-rotatable with said second casing 47. These braces are in turn connected to sliders 48, mounted upon the shaft 14 and controlled by rods 51 through a spring connection 52, which rods in turn fasten to a slider 53, mounted upon the threaded member 54. This threaded member is rotated through the medium of a chain 56 passing over a sprocket on the threaded member and over a similar sprocket upon a hand rotated wheel, which is turned through the medium of a handle 57. The sliding ring 44 has links 58 connecting it with each of the blades 43, the pivotal point being offset from the pivotal point of the blades 43, thus forming a pivoted arm to rotate the blades.

A counter-weight 59 serves to counterbalance the apparatus so that the same may rotate about its vertical axis, running through the sucker rod 8.

Figure 2:
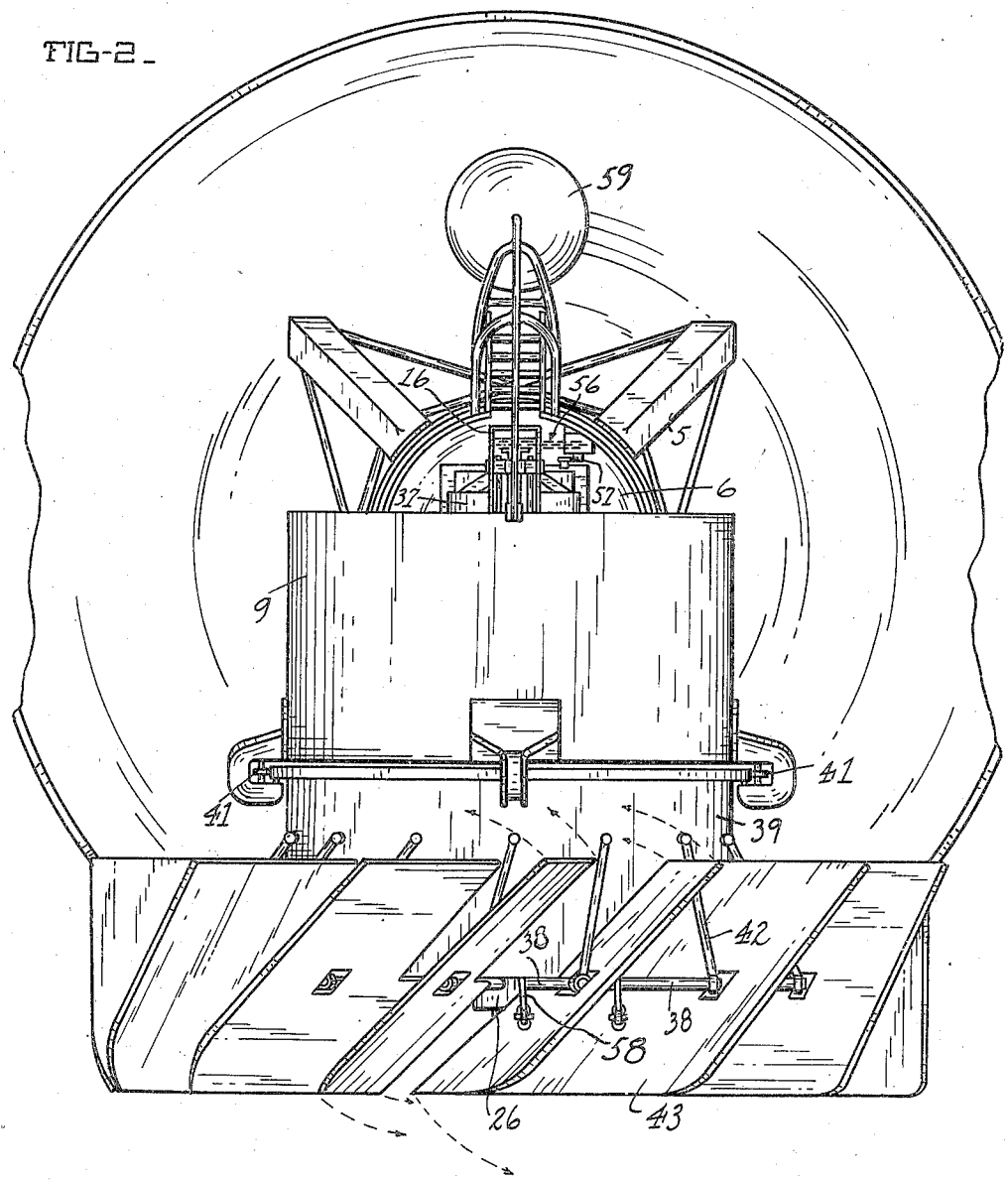
Fig. 2 is a top plan view of Fig. 1.
Figure 3:
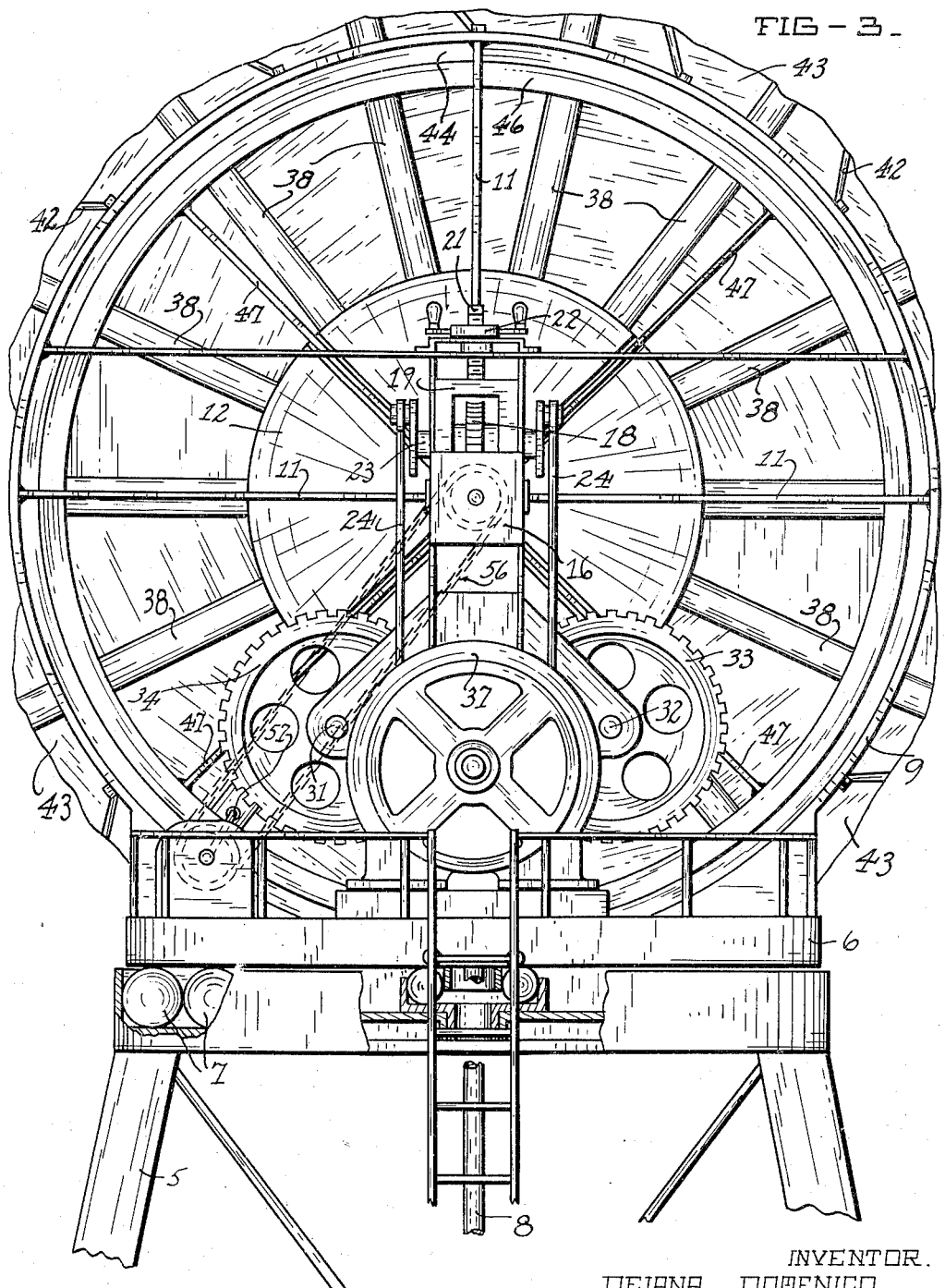
Fig. 3 is a rear elevation on an enlarged scale with the blades broken away.

The result of this construction is that when the device is constructed in accordance with my invention and installed where the wind will strike the same, and when the blades are moved from the position of Fig. 1, closed position, to that of Fig. 2, open position, the wind may act upon the blades so as to cause the same to rotate about the axis of the shaft 14. This will also rotate the ring 39 and the sliding ring 44. The gear 27 will rotate the gears 28 and 29; and through the shafts 31 and 32, the gears 33 and 34 will be rotated and will deliver power to the gear 36 and to the mechanism connected thereto. If it is desired to operate the sucker rod, the hand wheel 22 is rotated so as to bring the gear 18 into mesh with the worm 17, which will rotate the gear 18 and through the cranks, the rods 24, which are connected to the sucker rod 8. When it is desired to change the angle of the blades with relation to the approaching wind, the hand wheel 57 is rotated, which will rotate the threaded member 54 through the chain 56, moving the slider 53 in the desired direction, which in turn will pull upon the braces 47, moving the ring 46, sliding ring 44, and either pushing or pulling on the links 58 to cause the blades to rotate about their rods 38.

Figure 4:
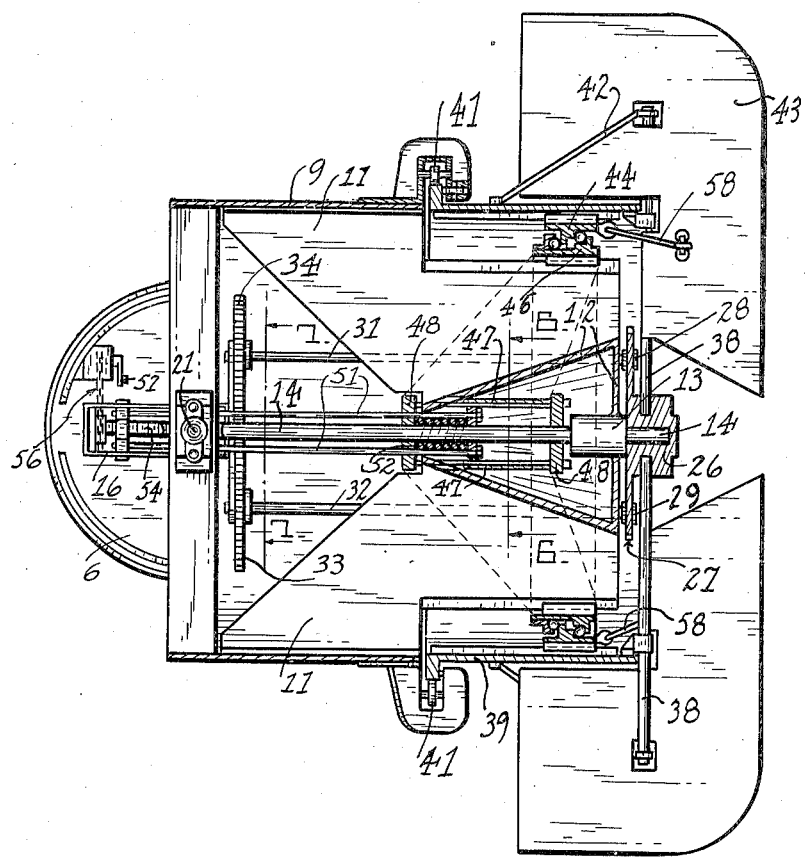
Fig. 4 is a cross sectional view taken on the line 4—4 of Fig. 1.

I wish to herein mention that when the wind is strong, the spring 52 (see Fig. 4) will compress, allowing vanes to open and the wind to pass through the apparatus. However, when the wind has diminished, the spring will expand, thus bringing the fans into operative position, and thus I have embodied in this invention an automatic governor.

The casing 9 and the counterweight act as a vane to keep the device faced into the wind.

The area of the counterweight 59 will be very much larger than here shown in the drawings, which will provide the necessary wind area to act as a vane.

Thus it will be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:—

1. In a device of the character described, a turntable rotatably supported, a fixed casing positioned on said turntable and projecting to one side of the axis of said turntable, a second casing rotatably secured to said casing and being of substantially the same diameter as said casing, a shaft supported through said casing and coinciding with the axis thereof, rods radially extending from said shaft, said rods being pivotally connected thereto, a blade secured to each of said rods, a sliding non-rotatable ring mounted within said second casing, a ring slidably rotatably mounted in said second casing, so constructed that said first-mentioned sliding ring may rotate thereover, a link connecting said first-mentioned sliding ring with each of said blades, and means for moving the sliding rings to vary the angular position of said blades.

2. In a device of the character described, a turntable rotatably supported, a fixed casing positioned on said turntable and projecting to one side of the axis of said turntable, a second casing rotatably secured to said casing and being of substantially the same diameter as said casing, a shaft supported through said casing and coinciding with the axis thereof, rods radially extending from said shaft, said rods being pivotally connected thereto, a blade secured to each of said rods, a sliding non-rotatable ring mounted within said second casing, a ring slidably rotatably mounted in said second casing, so constructed that said first-mentioned sliding ring may rotate thereover, a link connecting said first-mentioned sliding ring with each of said blades, means for moving the sliding rings to vary the angular position of said blades, and spring means for automatically adjusting said blades when the wind velocity exceeds a predetermined amount.

DEIANA DOMENICO.